United States Patent
Chopra et al.

(10) Patent No.: US 10,372,595 B1
(45) Date of Patent: Aug. 6, 2019

(54) SYSTEM AND METHOD TO DIAGNOSE APPLICATIONS BY ACCESSING LOG FILES ASSOCIATED WITH DIFFERENT SUBSYSTEMS OF A DATA CENTER VIA A COMMON INTERFACE

(71) Applicant: EMC IP Holding Company LLC, Hopkinton, MA (US)

(72) Inventors: Shelesh Chopra, Bangalore (IN); Gururaj Kulkarni, Bangalore (IN)

(73) Assignee: EMC IP Holding Company LLC, Hokinton, MA (US)

( * ) Notice: Subject to any disclaimer, the term of this patent is extended or adjusted under 35 U.S.C. 154(b) by 63 days.

(21) Appl. No.: 15/380,915

(22) Filed: Dec. 15, 2016

(51) Int. Cl.
    G06F 11/00 (2006.01)
    G06F 11/36 (2006.01)

(52) U.S. Cl.
    CPC ...... *G06F 11/3688* (2013.01); *G06F 11/3692* (2013.01)

(58) Field of Classification Search
    USPC .................................................. 714/38.1
    See application file for complete search history.

(56) References Cited

U.S. PATENT DOCUMENTS

| | | | | |
|---|---|---|---|---|
| 2010/0318855 A1* | 12/2010 | Beg | .................. | G06F 11/079 714/39 |
| 2011/0131295 A1* | 6/2011 | Jolfaei | .................. | G06F 11/366 709/219 |
| 2015/0301921 A1* | 10/2015 | Kumar | .................. | G06F 11/3612 714/38.1 |
| 2015/0309911 A1* | 10/2015 | Lefor | .................. | G06F 11/3495 714/37 |

* cited by examiner

*Primary Examiner* — Sarai E Butler
(74) *Attorney, Agent, or Firm* — Womble Bond Dickinson (US) LLP

(57) ABSTRACT

According to one embodiment, a computer system receives a user request from a user to diagnose an application, the request having information describing a symptom of a behavior of an application. In response to the request, the system identifies one or more components that provide services to the application. For each of the components, the system identifies a log file that logs events that have occurred during operations of the corresponding component, and parses the log file in view of the request to identify one or more events associated with the symptom of the behavior. The system analyzes the events associated with the symptom of the behavior to identify a potential problem. The system accesses a knowledgebase (KB) corresponding to the component to determine a potential solution to the problem.

18 Claims, 4 Drawing Sheets

SYSTEM AND METHOD TO DIAGNOSE APPLICATIONS BY ACCESSING LOG FILES ASSOCIATED WITH DIFFERENT SUBSYSTEMS OF A DATA CENTER VIA A COMMON INTERFACE

FIELD OF THE INVENTION

Embodiments of the present invention relate generally to a data center. More particularly, embodiments of the invention relate to diagnosing applications by accessing log files associated with different subsystems of a data center via a common interface.

BACKGROUND

In today's IT industry, data centers are becoming increasingly challenging to troubleshoot due to complexity of the product lines available in data centers, such as the numerous features of the product lines and/or compatibility of the different features of the product lines and/or products. Oftentimes support and engineering organizations exchange information back and forth to solve a support problem. With increased product line complexity and an increase in the sheer number of products and functionalities of products of product lines, it is difficult and very time costly to pin point symptoms to an issue to a particular component. For example, data centers with EMC NetWorker and EMC Data Domain may involve three different set of logs to troubleshoot. A need has arisen for a converged support system to address these challenges.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. "Components" throughout this application refer to software and/or hardware products, features of software and/or hardware products, or any software/hardware configurations having configuration files, database log(s), and/or log file(s).

According to some embodiments, a computer system receives a user request from a user to diagnose an application, the request having information describing a symptom of a behavior of an application. In response to the request, the system identifies one or more components that provide services to the application. For each of the components, the system identifies a log file that logs events that have occurred during operations of the corresponding component, and parses the log file in view of the request to identify one or more events associated with the symptom of the behavior. The system analyzes the events associated with the symptom of the behavior to identify a potential problem. The system accesses a knowledgebase (KB) corresponding to the component to determine a potential solution to the problem.

Figure 1:
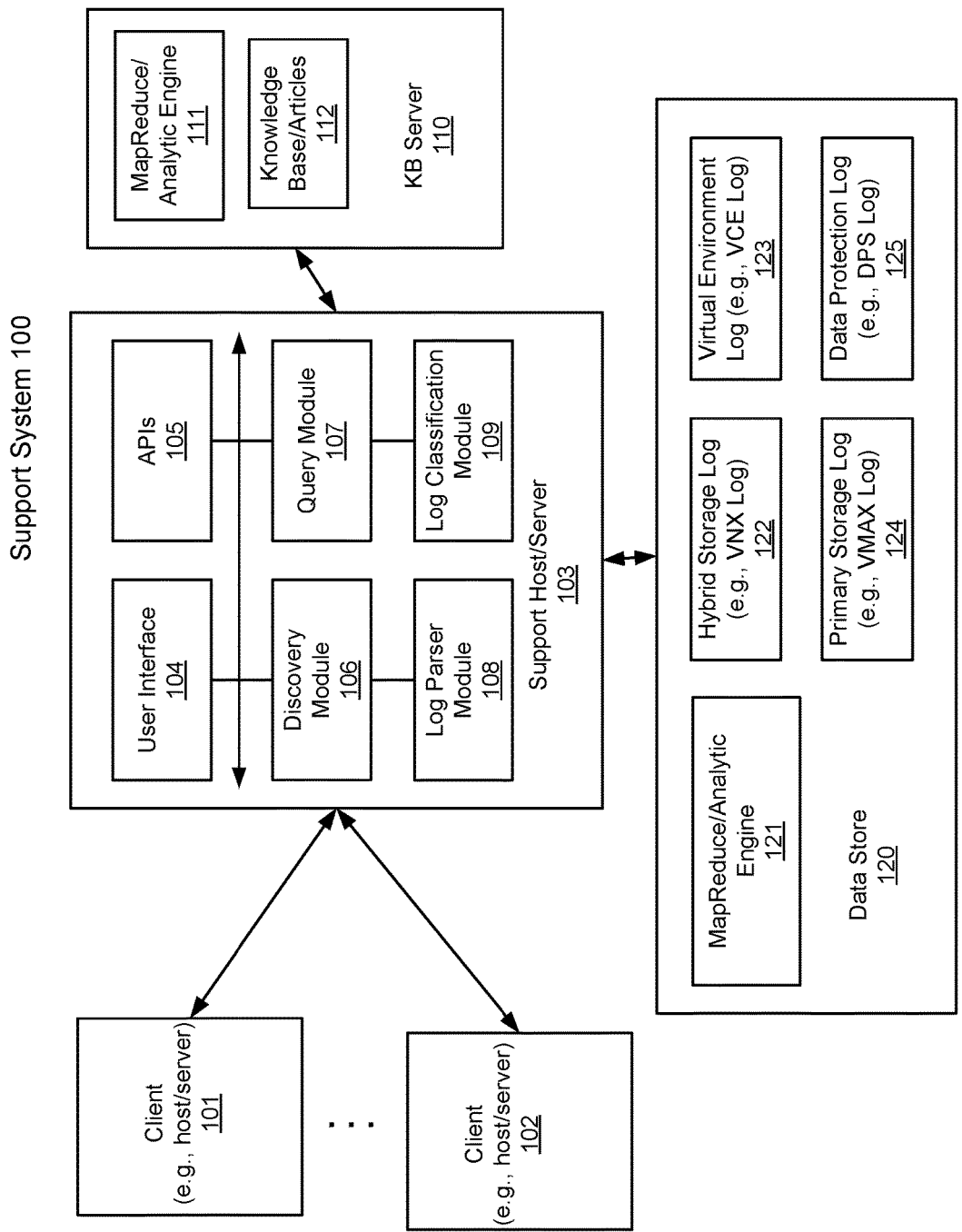
FIG. 1 is a block diagram illustrating a support system according to one embodiment of the invention.

FIG. 1 is a block diagram illustrating a support system according to one embodiment of the invention. Referring to FIG. 1, support system 100 includes, but is not limited to, one or more client systems 101-102 communicatively coupled to support host or server 103 over a network (not shown). The support host or server 103 is communicatively coupled to data store 120 and KB server 110. Note that the terms "client," "user" may be interchanged throughout this application. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. The network may be any type of networks such as a local area network (LAN), a wide area network (WAN) such as the Internet, a fiber network, a storage network, or a combination thereof, wired or wireless. Clients 101-102 may be in physical proximity or may be physically remote from one another. Support host or server 103 may be located in proximity to one, both, or neither of clients 101-102. Support host or server 103 may include or represent any type of servers or a cluster of one or more servers (e.g., cloud servers). For example, support host or server 103 may be a storage server used for various different purposes, such as to provide multiple users or client systems with access to shared data and/or to back up (or restore) data (e.g., mission critical data). Support host or server 103 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Support host or server 103 may further provide storage services via an object-based protocol and Hadoop distributed file system (HDFS) protocol.

In one embodiment, support host or server 103 includes user interface 104 to allow users to access certain functionalities or resources of support host or server 103. For example, user interface 104 may be a portal to allow user to interact with support host or server 103. User interface 104 may prompt a user for a user name and password. When a user enters a login name and password, user interface 104 authenticates the user based on stored username and passwords on support host or server 103. Once logged in, a user may interactively query for support solution associated with a symptom through a questionnaire or a simple text search, and/or browse or search a record from data store 120 or a knowledgebase article from KB server 110. User interface 104 may provide a graphical view for visual analyses. For example, user interface 104 may be implemented by leveraging existing open-source software such as Kibana for graphical analyses. Kibana allows users to visualize data stored in an accompanied product ElasticSearch, such as histograms, line chart, pie chart, sunbursts, geospatial map tile, and etc.

In one embodiment, support host or server 103 includes APIs 105 to allow a user to access certain functionalities or resources of support host or server 103. APIs 105 provide third-party applications or smart mobile devices (e.g., through a mobile App) access to functionalities or resources of support host or server 103. APIs 105 may implement functionalities similar to user interface 104 as discussed above. In another example, a mobile App may send notification, provide simple search and browse functionalities of knowledge base and articles.

In one embodiment, support host or server 103 includes, but is not limited to, discovery module 106 which may be implemented in software, hardware, or a combination thereof. Discovery module 106 may be in communication with a user through user interface 104 and/or APIs 105. Discovery module 106 identifies one or more components that provide services to an application (e.g., backend support). Discovery module 106 may be implemented to leverage existing EMC or VMWare software to discover components of the data center. For example, discovery module 106 may interact with software such as EMC SRM suite to discover EMC products, VMWare Ops Center Suite to discover virtualized environments (e.g., virtual machines), and applications such as EMC AppSync or EMC DPS Suite to discover Oracle or DB2 databases of a data center. In another embodiment, discovery module 106 may discover components of a data center. Discovery module 106 may receive configuration and log files from parser module 108 and compares the configuration and log files with predetermined signatures of different types of configuration and log files.

In one embodiment, support host or server 103 includes log parser module 108, which may be implemented in software, hardware, or a combination thereof. Log parser module 108 communicates with data store or data stores 120 to parse different log files or database records, which may be stored at various locations associated with different components or subsystems, locally or remotely. These logs may be accessed via their respective APIs. Log parser module 108 may classify logs based on time stamp, category (e.g., critical events or warning events), component, and log message. Discovery module 106 may take parsed log files to determine components of a data center. Log parser module 108 may be implemented by leveraging existing software. For example, log parser module 108 may be implemented by leveraging existing open-source software such as Logstash. Logstash is an open source, server-side data processing pipeline that ingests data from a multitude of sources simultaneously, transforms it, and routes the transformed data to a downstream application to be stored and analyzed. Alternatively, log parser module 108 may be implemented as a standalone or a part of a standalone application.

In one embodiment, support host or server 103 includes log classification module 109 which may be implemented in software, hardware, or a combination thereof. Log classification module 109 may communicate with data store 120 and log parser module 108 to determine a component or subsystem associated with a parsed log file. Log classification module 109 may take parsed log files and categorized them with one or more components of a data center according to predetermined rules or signatures associated with different components log files of the data center. Log classification module 109 may be implemented by leveraging existing software. For example, log classification module 109 may be implemented by leveraging the open-source software Pivotal Big Data Suite with Spring XD, Logstash and/or Flume. Flume is a scalable solution for streaming logs into a Hadoop framework. It is a distributed data ingestion system for efficiently collecting, aggregating and moving huge amounts of data into Hadoop data file system (HDFS). In another example, log classification module 109 may be implemented by leverage open-source database software such as Pivotal Big Data Suite, an open-source scale-out (scale horizontally to add more nodes for parallel processing) data management system. Alternatively, log classification module 109 may be implemented as a standalone or a part of a standalone application.

In one embodiment, support host or server 103 further includes a query module 107, which may be implemented in software, hardware, or a combination thereof. Query module 107 may be in communication with users through user interface 104 and/or APIs 105. A user can interact with the query module 107 by typing in a query string or by describing the symptom or behavior experienced through an interactive questionnaire. Query module 107 uses the symptoms or descriptions and/or the query string to form a query request for a support solution. The symptoms or descriptions may include an error message from a product, a time stamp, and potential components involved. An example implementation of query module 107 may be by leveraging open-source software Elastic Search. Elastic Search is a distributed, RESTful search and analytics engine for solving use cases. It lets users perform and combine multiple types of searches, such as, structured, unstructured, geo, metric at any scale.

In one embodiment, data store 120 may be implemented locally (e.g., single node operating environment) or remotely (e.g., multi-node operating environment) via a bus or a network. Data store 120 provides storage of configuration files, log files and database log records. Data store 120 is communicatively coupled to support host/server 103 to provide support host/server 103 with the stored log files and database records. In one embodiment, data store 120 may be a HDFS cluster. In one embodiment, data store 120 may include MapReduce/analytic engine 121 which may be implemented in software, hardware, or a combination thereof. MapReduce/analytic engine 121 may represent any MapReduce service related framework or systems configured or adapted to provide MapReduce services. MapReduce is a framework for processing parallelizable problems across large datasets using a large number of computers or nodes of a cluster. A MapReduce framework marshals distributed servers to run various tasks in parallel to provide scalability and fault tolerance for a variety of applications. Processing can occur on data stored in a filesystem or a database. Analytic engine refers to the use of business logic to combine an error message, time stamp of the error, and components, to search through the respective logs to fetch for relevant data. An example implementation of an analytic engine may be by leveraging open-source software Elastic Search and/or Pivotal Big Data Suit HAWQ. In one embodiment, analytic engine may include self-learning capabilities to automatically correct a query string based on prior search history. In another embodiment, analytic engine may automatically route queried solutions and information to predetermined personas or parties to a predetermined personas who is involved with a queried solution or components of a queried solution. For example, personas such as administrative staffs, customers, engineering staffs, organizational staffs, and support staffs.

In one embodiment, data store 120 includes log files produced by a storage environment, virtual environment, and/or data protection environment of a data center. An implementation of data store 120 may leverage open-source software such as Pivotal Big Data Suite and Logstash. Logstash is a software server-side data processing pipeline that ingests data from a multitude of sources simultaneously, transforms it, and then sends it to a parser. Logstash may be installed on any of the components (local or remote) supported by a data center. Each of the components thereafter feeds corresponding logs to Logstash, regardless of the log file or database record format. For example, Logstash may be installed on EMC data domain, EMC recovery point, EMC primary storage, EMC NetWorker, EMC application agent (managing backup operations and workflow), and EMC protection point of a data center. In another embodiment, data store 120 may fetch log files from different components by secure file transfer protocol.

In one embodiment, data store 120 includes hybrid storage log 112. Hybrid storage logs are logs that provide diagnostic information of a hybrid storage solution of the data center. For example, hybrid storage log 112 may be VNX logs. VNX logs are logs produced by an EMC VNX system. VNX logs may log events, system notifications, performance statistics, or status of an EMC VNX system supported by the data center. In another embodiment, data store 120 includes virtual environment log 123. Virtual environment log are logs that provide diagnostic information of a virtual environment setup of the data center. For example, virtual environment log 123 may be VCE logs or VMWare-related logs. In another embodiment, data store 120 includes primary storage log 124. Primary storage log are logs that provide diagnostic information of a primary storage system of the data center. An example primary storage may be any of clients 101-102 that provides storage to other local clients. An example primary storage log 124 is VMAX log of EMC VMAX. In another embodiment, data store 120 includes data protection log 125. Data protection log are logs of a data domain or similar secondary/backup storage system. For example, data protection log 125 may be DPS logs.

In one embodiment, KB server 110 may be implemented locally (e.g., single node operating environment) or remotely (e.g., multi-node operating environment) via a bus or a network. KB server 110 stores knowledge base/articles 112 and provides them to support host or server 103 upon a user request. For example, a user may browse or search certain knowledgebase such as knowledge base/articles 112 via user interface 104 or APIs 105. Alternatively, knowledge base/articles 112 may return from a user query/request based on components associated with logs matching symptoms/questionnaires associated with the query. A knowledgebase or article contains technical manuals and technical information. In addition, knowledgebase may certain automated responses and information related to general queries from users. Further, knowledgebase may store details of interactions and solutions based on previous identified problems.

In another embodiment, KB server 110 may include MapReduce/analytic engine 111 which may be implemented in software, hardware, or a combination thereof. Similar to MapReduce/analytic engine 121 of data store 120, MapReduce/analytic engine 111 parallelizes any operations associated with ordering and sorting of the knowledge base/articles.

Figure 2:
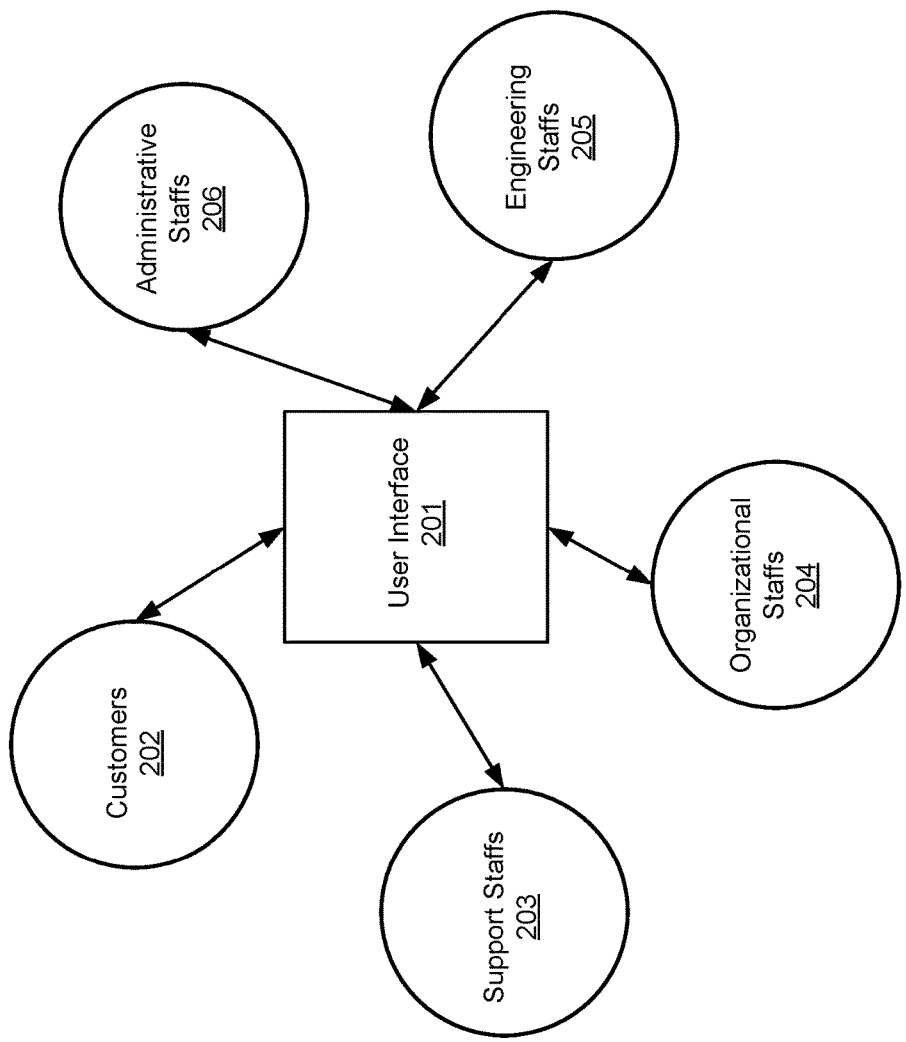
FIG. 2 is a block diagram illustrating different personas of a support system according to one embodiment of the invention.

FIG. 2 is a block diagram illustrating different personas utilizing support system 100 to solve different support challenges according to one embodiment of the invention. In one embodiment, user interface 201 may be user interface 104 or a third-party application or mobile application in communication with APIs 105 of support host/server 103 of FIG. 1. In one embodiment, user interface 201 may help solve customer-related challenges of customers 202. Customer related challenges may include ease of use of a product or application hosted by a data center; difficulty in troubleshooting and debugging technical issues related to applications and/or a virtual environment; and access to manuals, documentations, knowledge bases, and articles for the product or application.

In another embodiment, user interface 201 may help solve administrative-related challenges of administrative staffs 206. Administrative-related challenges may include complexity in troubleshooting and debugging technical issues related to a data center, and monitoring of performance statistics. For example, administrative staffs 206 may be any one of application administrative staff (admin), storage admin, virtual data center admin, or backup admin of a data center.

In another embodiment, user interface 201 may help solve engineering team challenges of engineering staffs 205. Engineering-related challenges may include any challenges related to solving an issue of a customer of a data center, troubleshooting and debugging of technical issues, and difficulties of developing a consensus of the different stages of product development.

In another embodiment, user interface 201 may help solve support related challenges of support staffs 203. Support-related challenges may include any challenges related to maintaining customer confidence in product and solutions of a data center, provide support to customers 202 and engineer staffs 205 to meet service level objectives.

In another embodiment, user interface 201 may help solve company or organizational related challenges of organizational staffs 204. Organizational related challenges may include any challenges related to cost cutting or improvements in performance statistics of a data center, or any tasks that may impact an organization's revenue or profit.

Figure 3:
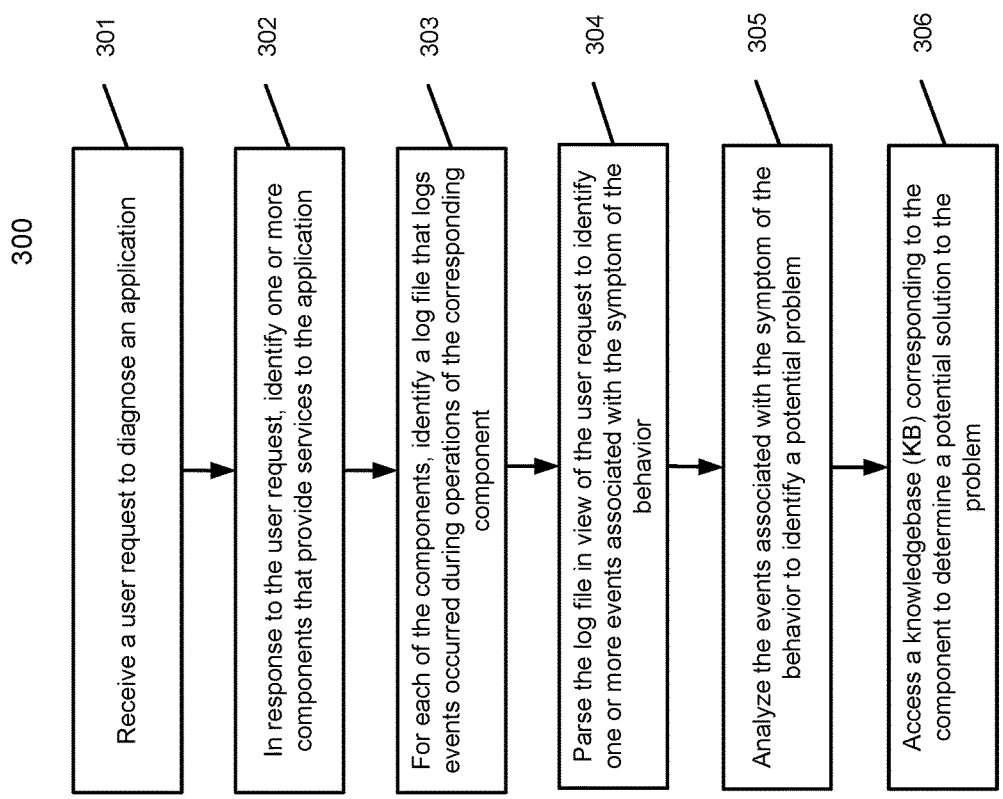
FIG. 3 is a flow diagram illustrating a process to provide solutions to a support challenge according to one embodiment of the invention.

FIG. 3 is a flow diagram illustrating a process to provide solutions to a support challenge according to one embodiment of the invention. Process 300 may be performed by processing logic that includes hardware (e.g. circuitry, dedicated logic, etc.), software (e.g., embodied on a non-transitory computer readable medium), or a combination thereof. For example, process 300 may be performed by support host or server 103 of FIG. 1. Referring to FIG. 3, at block 301, processing logic receives a user request to diagnose an application, the user request having information describing a symptom of a behavior of an application. At block 302, in response to the user request, processing logic identifies one or more components that provide services to the application. At block 303, for each of the components, processing logic identifies a log file that logs events occurred during operations of the corresponding component. At block 304, processing logic parses the log file in view of the user request to identify one or more events associated with the symptom of the behavior. At block 305, processing logic analyzes the events associated with the symptom of the behavior to identify a potential problem. At block 306, processing logic accesses a knowledgebase (KB) corresponding to the component to determine a potential solution to the problem. In one embodiment, support host or server 103 returns to the user, a link to an article stored in the knowledgebase describing a solution to the problem.

In one embodiment, support host or server 103 presents a plurality of graphical representations representing a plurality of enterprise solutions to a user, and in response to a user selection of one of the graphical representations selecting one of the enterprise solutions, support host or server 103 automatically discovers one or more subsystems associated with the selected enterprise solution, such that the application is part of the selected enterprise solution. In another embodiment, support host or server 103 prompts the user one or more queries to obtain one or more error messages describing the symptom of the behavior, such that the error messages are included in the user request. In another embodiment, support host or server 103 prompts the user one or more queries to obtain one or more error messages describing the symptom of the behavior, such that the error messages are included in the user request. In another embodiment, support host or server 103 parsing a log file includes searching in the log file based on at least one of the error messages to locate the events that are associated with the error message. In another embodiment, support host or server 103 accessing the KB is performed by searching articles stored in the KB based on the error messages to identify one or more articles that are related to the error messages.

Note that some or all of the components as shown and described above (e.g., log parser module 108 of FIG. 1) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 4:
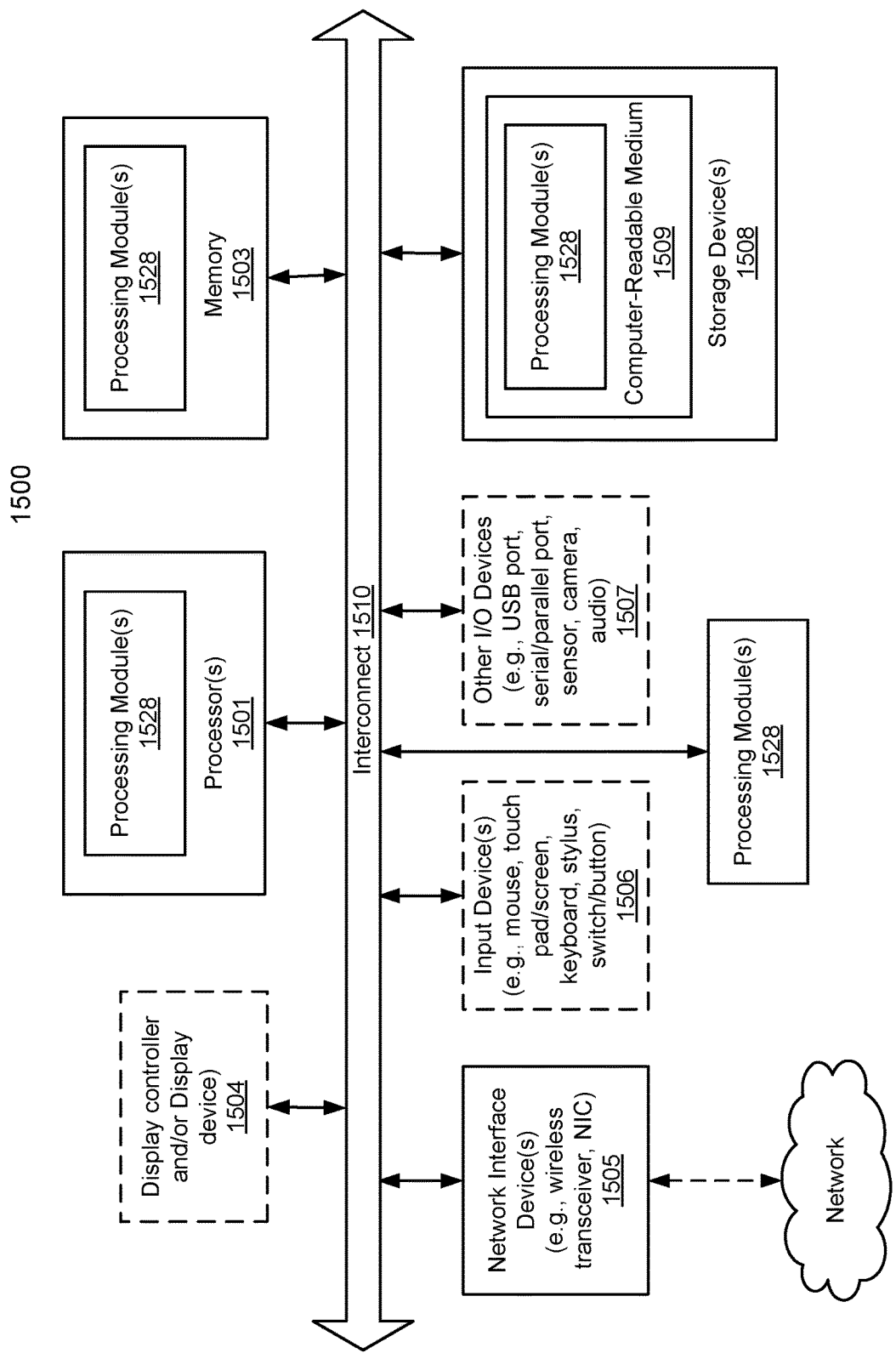
FIG. 4 is a block diagram illustrating a data processing system according to one embodiment.

FIG. 4 is a block diagram illustrating an example of a data processing system which may be used with one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, log parser module 108, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method to diagnose applications, comprising:
   receiving a user request to diagnose an application, the user request having information describing a symptom of a behavior of an application;
   in response to the user request, identifying one or more components that provide services to the application;
   for each of the components,
      identifying a log file that logs events occurred during operations of the corresponding component, and
      parsing the log file in view of the user request to identify one or more events associated with the symptom of the behavior, comprising classifying the events logged in the log file based on at least one of: a time stamp, a category, a component, or a log message;
   analyzing the events associated with the symptom of the behavior to identify a potential problem;
   accessing a knowledgebase (KB) corresponding to the component to determine a potential solution to the problem, wherein the KB is hosted at a KB server where operations associated with ordering and sorting of articles stored in the KB are parallelized.

2. The method of claim 1, further comprising returning to the user a link to an article stored in the knowledgebase describing the solution.

3. The method of claim 1, further comprising:
   presenting a plurality of graphical representations representing a plurality of enterprise solutions to a user;
   in response to a user selection of one of the graphical representations selecting one of the enterprise solutions, automatically discovering one or more subsystems associated with the selected enterprise solution, wherein the application is part of the selected enterprise solution.

4. The method of claim 3, further comprising prompting the user one or more queries to obtain one or more error messages describing the symptom of the behavior, wherein the error messages are included in the user request.

5. The method of claim 4, wherein parsing a log file comprising searching in the log file based on at least one of the error messages to locate the events that are associated with the error message.

6. The method of claim 4, wherein accessing the KB is performed by searching articles stored in the KB based on the error messages to identify one or more articles that are related to the error messages.

7. A computer-readable storage medium having instructions stored therein, which when executed by a computer, cause the computer to perform operations, the operations comprising:
   receiving a user request to diagnose an application, the user request having information describing a symptom of a behavior of an application;
   in response to the user request, identifying one or more components that provide services to the application;
   for each of the components,
      identifying a log file that logs events occurred during operations of the corresponding component, and
      parsing the log file in view of the user request to identify one or more events associated with the symptom of the behavior, comprising classifying the events logged in the log file based on at least one of: a time stamp, a category, a component, or a log message;
   analyzing the events associated with the symptom of the behavior to identify a potential problem;
   accessing a knowledgebase (KB) corresponding to the component to determine a potential solution to the problem, wherein the KB is hosted at a KB server where operations associated with ordering and sorting of articles stored in the KB are parallelized.

8. The computer-readable storage medium of claim 7, wherein the operations further comprise returning to the user a link to an article stored in the knowledgebase describing the solution.

9. The computer-readable storage medium of claim 7, wherein the operations further comprise:
   presenting a plurality of graphical representations representing a plurality of enterprise solutions to a user;
   in response to a user selection of one of the graphical representations selecting one of the enterprise solutions, automatically discovering one or more subsystems associated with the selected enterprise solution, wherein the application is part of the selected enterprise solution.

10. The computer-readable storage medium of claim 9, further comprising prompting the user one or more queries to obtain one or more error messages describing the symptom of the behavior, wherein the error messages are included in the user request.

11. The computer-readable storage medium of claim 10, wherein parsing a log file comprising searching in the log file based on at least one of the error messages to locate the events that are associated with the error message.

12. The computer-readable storage medium of claim 10, wherein accessing the KB is performed by searching articles stored in the KB based on the error messages to identify one or more articles that are related to the error messages.

13. A data processing system, comprising:
   a processor: and a memory couple to the process to store instructions, which when executed by the processor, cause the processor to perform operations, the operations include receiving a user request to diagnose an application, the user request having information describing a symptom of a behavior of an application;

in response to the user request, identifying one or more components that provide services to the application;

for each of the components, identifying a log file that logs events occurred during operations of the corresponding component, and parsing the log file in view of the user request to identify one or more events associated with the symptom of the behavior, comprising classifying the events logged in the log file based on at least one of: a time stamp, a category, a component, or a log message;

analyzing the events associated with the symptom of the behavior to identify a potential problem;

accessing a knowledgebase (KB) corresponding to the component to determine a potential solution to the problem, wherein the KB is hosted at a KB server where operations associated with ordering and sorting of articles stored in the KB are parallelized.

14. The data processing system of claim 13, wherein the operations further comprise returning to the user a link to an article stored in the knowledgebase describing the solution.

15. The data processing system of claim 13, wherein the operations further comprise:

presenting a plurality of graphical representations representing a plurality of enterprise solutions to a user;

in response to a user selection of one of the graphical representations selecting one of the enterprise solutions, automatically discovering one or more subsystems associated with the selected enterprise solution, wherein the application is part of the selected enterprise solution.

16. The data processing system of claim 15, wherein the operations further comprise prompting the user one or more queries to obtain one or more error messages describing the symptom of the behavior, wherein the error messages are included in the user request.

17. The data processing system of claim 16, wherein parsing a log file comprising searching in the log file based on at least one of the error messages to locate the events that are associated with the error message.

18. The data processing system of claim 16, wherein accessing the KB is performed by searching articles stored in the KB based on the error messages to identify one or more articles that are related to the error messages.

* * * * *